(12) United States Patent
Nakayama (10) Patent No.: US 8,742,355 B2
(45) Date of Patent: Jun. 3, 2014

(54) RADIATION IMAGE CAPTURING SYSTEM AND METHOD OF ADJUSTING SAME

(75) Inventor: Hiroki Nakayama, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 560 days.

(21) Appl. No.: 12/457,621

(22) Filed: Jun. 17, 2009

(65) Prior Publication Data

US 2009/0314948 A1    Dec. 24, 2009

(30) Foreign Application Priority Data

Jun. 23, 2008   (JP) .................................. 2008-162822

(51) Int. Cl.
*G01T 1/20* (2006.01)
*G01T 1/24* (2006.01)

(52) U.S. Cl.
CPC ........................................ *G01T 1/20* (2013.01)
USPC ................................ 250/363.01; 250/370.09

(58) Field of Classification Search
CPC ............... G01T 1/20; G01T 1/24; H05G 1/44
USPC .............. 378/16, 37, 65, 97, 108; 250/361 R, 250/370.09
See application file for complete search history.

(56) References Cited

U.S. PATENT DOCUMENTS

| | | | |
|---|---|---|---|
| 6,208,710 B1 * | 3/2001 | Nagai | 378/108 |
| 6,292,536 B1 | 9/2001 | Chichereau et al. | |
| 7,433,445 B2 | 10/2008 | Okada et al. | |
| 7,791,039 B2 * | 9/2010 | Nakayama | 250/393 |
| 2003/0226972 A1 * | 12/2003 | Wong et al. | 250/368 |
| 2006/0016998 A1 * | 1/2006 | Ohara | 250/370.11 |
| 2007/0201617 A1 * | 8/2007 | Nakayama et al. | 378/108 |
| 2008/0224047 A1 * | 9/2008 | Nakayama | 250/354.1 |
| 2009/0314948 A1 * | 12/2009 | Nakayama | 250/370.09 |
| 2011/0216882 A1 * | 9/2011 | Nakayama | 378/62 |

FOREIGN PATENT DOCUMENTS

| | | |
|---|---|---|
| JP | 2000-157524 | 6/2000 |
| JP | 2004-209152 A | 7/2004 |
| JP | 2007-029646 | 2/2007 |
| JP | 2007-236524 A | 9/2007 |
| JP | 2007-275475 | 10/2007 |

* cited by examiner

*Primary Examiner* — Casey Bryant
(74) *Attorney, Agent, or Firm* — Jean C. Edwards, Esq.; Edwards Neils PLLC

(57) ABSTRACT

The present invention relates to a radiation image capturing system and a method of adjusting the same. An image capturing condition setting unit sets a target, a filter, and a tube voltage as image capturing conditions depending on the sensitivity characteristics of a radiation conversion panel that is selected by a panel selector, in a radiation source and a radiation source control apparatus. Radiation image information of a subject is recorded in the radiation conversion panel according to the set image capturing conditions. An image processing condition setting unit sets image processing conditions corresponding to the sensitivity characteristics of the radiation conversion panel in an image processor. The image processor processes the radiation image information acquired from the radiation conversion panel according to the set image processing conditions.

7 Claims, 8 Drawing Sheets

RADIATION IMAGE CAPTURING SYSTEM AND METHOD OF ADJUSTING SAME

CROSS-REFERENCE TO RELATED APPLICATIONS

The present application claims priority from Japanese Patent Application No. 2008-162822, filed Jun. 23, 2008, the contents of which are herein incorporated by reference in their entirety.

BACKGROUND OF THE INVENTION

1. Field of the Invention

The present invention relates to a radiation image capturing system for capturing a radiation image of a subject using a radiation conversion panel, and a method of adjusting such a radiation image capturing system.

2. Description of the Related Art

In the medical field, there have widely been used radiation image capturing apparatus which apply a radiation to a subject and guide the radiation that has passed through the subject to an X-ray film or a radiation conversion panel, which captures a radiation image from the radiation.

According to an analog image capturing process which employs X-ray films, the dose and quality (X-ray energy spectrum) of X-rays to be applied to the subject have to be set according to the characteristics of the X-ray film used, in order to produce an image at an optimum density or quality (gradation). Therefore, it is currently difficult to take into account reduction of the level of radiation exposure which the subject undergoes.

There has been developed a radiation conversion panel which is capable of digitally capturing a radiation image. A stimulable phosphor panel (hereinafter referred to as "IP" (Imaging Plate)) is a radiation conversion panel which stores, in a phosphor, radiation energy representative of radiation image information of a subject and which subsequently emits stimulated light representative of the stored radiation image information when irradiated with stimulating light. The IP with the recorded radiation image information is supplied to a reading apparatus, which reads the recorded radiation image information from the IP to produce a visible radiation image from the read radiation image information.

In sites where medical procedures are performed, such as operating rooms or the like, it is necessary to read and display recorded radiation image information immediately from a radiation conversion panel, for the purpose of quickly and appropriately treating the patient. As a radiation conversion panel which meets such a requirement, there has been developed a radiation conversion panel (hereinafter referred to as "FPD" (Flat Panel Detector)) having a solid-state detector therein for converting radiation directly into electric signals, or for converting radiation into visible light with a scintillator, and then converting such visible light into electric signals in order to read the detected radiation image.

There is a radiation image capturing apparatus employing a solid-state imaging device (hereinafter referred to as "CCD" (Charge Coupled Device)) as a radiation conversion panel.

According to a digital image capturing process which employs such a radiation conversion panel, since acquired radiation image information represents digital information, any of various image processings such as density adjustment, gradation adjustment, etc. can be performed on the radiation image information. Therefore, it is possible to make radiation settings about a radiation dose and a radiation quality with a view to reducing the level of radiation exposure on the subject.

It is desirable to appropriately select any one of those different radiation conversion panels capable of digitally capturing radiation images depending on the state of the subject, the location where a radiation image is captured, the purpose for which a radiation image is captured, etc.

For example, the IP is suitable for imaging special regions of an emergency patient or a subject which cannot be moved easily because the IP can easily be carried around, can have a large choice of shapes, and can capture any desired areas of the subject. The FPD lends itself to capturing radiation images of a subject while an operation is being performed on the subject or the subject is undergoing a complete medical checkup because it is possible for the FPD to capture high-quality radiation images quickly. Though the CCD is lower in captured image quality than the IP and the FPD, it is suitable for use in treating the patient using a catheter, for example, while the doctor is confirming radiation images captured by the CCD or for combining a plurality of radiation images captured by the CCD in different directions into a three-dimensional image because the CCD is able to acquire real-time moving images and also to acquire radiation images independent on the direction in which the radiation is applied to the subject.

The radiation conversion panels capable of digitally capturing radiation images have respective inherent sensitivity characteristics. Therefore, appropriate image capturing conditions need to be set up for the respective radiation conversion panels in order for them to acquire suitable radiation image information. The image capturing conditions include, for example, the focal spot size of the radiation source, a filter for adjusting the spectrum of X-rays applied to the radiation conversion panel, a tube voltage, a tube current, an X-ray irradiation time, the type of a target for outputting an X-ray, etc.

Japanese Laid-Open Patent Publication No. 2000-157524 discloses a technique for applying a radiation having a low dose through a subject to a radiation conversion panel to acquire a pre-exposure image of the subject and setting image capturing conditions including a focal track (if the image capturing apparatus has a dual focal track), a filter used, a tube voltage, information as to whether there is a grid or not, a focal spot size, and a value represented by the product of a tube current and an irradiation time, using the acquired pre-exposure image.

According to the technique disclosed in Japanese Laid-Open Patent Publication No. 2000-157524, however, the radiation conversion panel used is predetermined, and image capturing conditions for acquiring appropriate radiation image information can be set with respect to only the radiation conversion panel. The disclosed technology is not directed to the setting of image capturing conditions suitable for a selected one of different radiation conversion panels.

SUMMARY OF THE INVENTION

It is an object of the present invention to provide a radiation image capturing system which is capable of capturing appropriate radiation image information of a subject depending on a radiation conversion pane used, and a method of adjusting such a radiation image capturing system.

According to the present invention, there is provided a radiation image capturing system comprising a radiation source for outputting a radiation to pass through a subject, a radiation conversion panel for being irradiated with the radiation which has passed through the subject and converting the radiation into radiation image information of the subject, and an image capturing condition setting unit for setting image capturing conditions depending on sensitivity characteristics of the radiation conversion panel. The radiation source is adjusted based on the image capturing conditions set by the image capturing condition setting unit, and the adjusted radiation source applies the radiation to the subject.

According to the present invention, there is also provided a method of adjusting a radiation image capturing system including a radiation source for outputting a radiation to pass through a subject, and a radiation conversion panel for being irradiated with the radiation which has passed through the subject and converting the radiation into radiation image information of the subject. The method comprises the steps of setting image capturing conditions depending on sensitivity characteristics of the radiation conversion panel, and adjusting the radiation source based on the set image capturing conditions. The adjusted radiation source applies the radiation to the subject.

With the radiation image capturing system and the method of adjusting the radiation image capturing system according to the present invention, when a radiation conversion panel is selected, image capturing conditions are set depending on the selected radiation conversion panel to obtain appropriate radiation image information of the subject from the selected radiation conversion panel.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
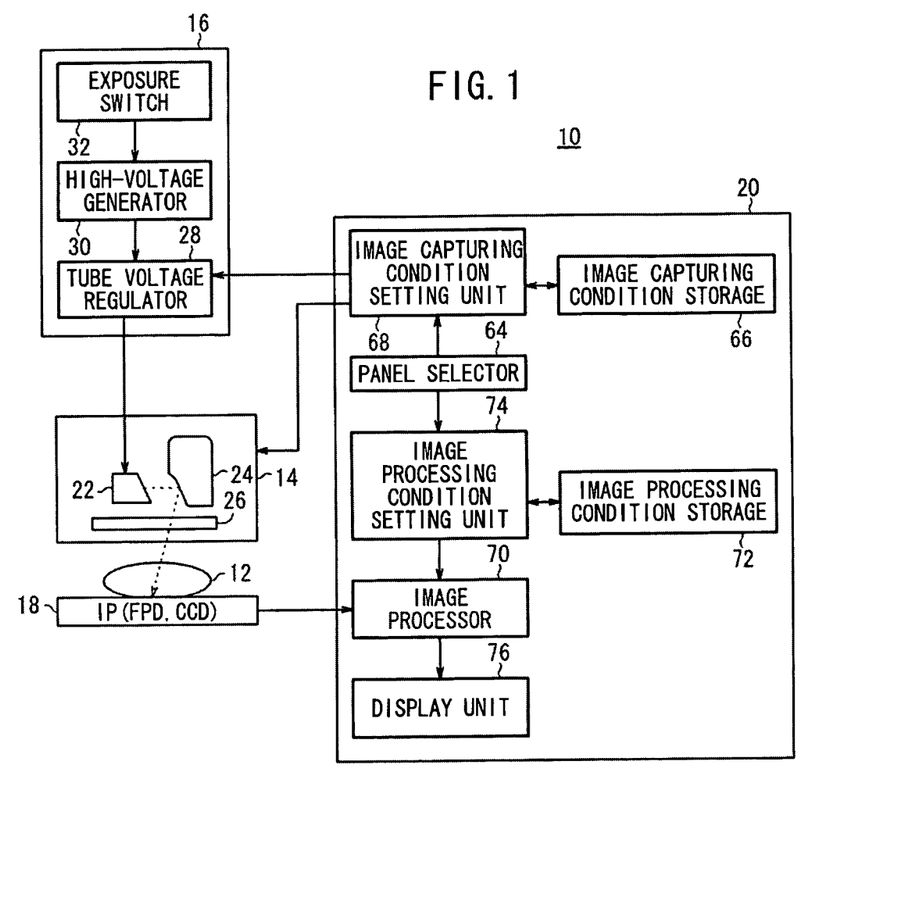
FIG. 1 is a block diagram of a radiation image capturing system according to an embodiment of the present invention.

FIG. 1 shows in block form a radiation image capturing system 10 according to an embodiment of the present invention.

As shown in FIG. 1, the radiation image capturing system 10 basically comprises a radiation source 14 for outputting and applying X-rays to a subject 12, a radiation source control apparatus 16 for controlling the radiation source 14, a radiation conversion panel 18 for converting the X-rays that have passed through the subject 12 into radiation image information, and a processing apparatus 20 for setting image capturing conditions in the radiation source 14 and the radiation source control apparatus 16 and processing the radiation image information acquired from the radiation conversion panel 18.

The radiation source 14 comprises a cathode 22 for outputting an electron beam under a high voltage applied thereto, a target 24 for outputting X-rays upon application thereto of the electron beam output from the cathode 22, and a filter 26 for adjusting the spectrum of the X-rays output from the target 24. The target 24 is made of any one of various materials including molybdenum (Mo), rhodium (Rh), tungsten (W), etc. which is selected depending on the sensitivity characteristics of the radiation conversion panel 18. The filter 26 is made of any one of various materials including Mo, Rh, aluminum (Al), etc. which is selected to selectively extract characteristic X-rays in combination with the target 24.

Figure 2:
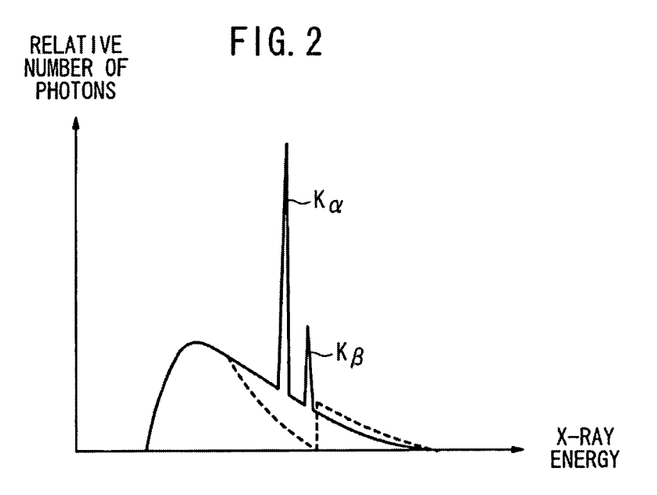
FIG. 2 is a diagram showing the relationship between the energy characteristics (indicated by the solid-line curve) of X-rays output from a target of molybdenum (Mo) and the absorption characteristics (indicated by the dotted-line curve) of X-rays absorbed by a filter of molybdenum.
Figure 6:
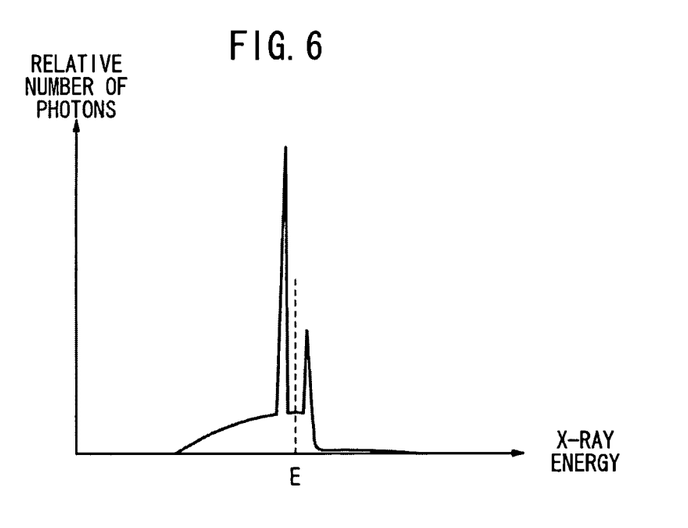
FIG. 6 is a graph showing an X-ray spectrum which is plotted when a target and a filter are made of molybdenum (Mo)

FIG. 2 shows the relationship between the energy characteristics (indicated by the solid-line curve) of X-rays output from the target 24 of Mo and the absorption characteristics (indicated by the dotted-line curve) of X-rays absorbed by the filter 26 of Mo. The vertical axis of FIG. 2 represents the relative number of photons. The X-rays output from the target 24 of Mo have strong energy levels at $K\alpha$ (17.4 keV) and $K\beta$ (19.5 keV). The filter 26 of Mo selectively extracts characteristic X-rays $K\alpha$, $K\beta$ and removes X-rays at high energy levels of 20 keV or higher, thereby producing an X-ray spectrum as shown in FIG. 6, for example, for increased radiation image contrast.

The radiation source control apparatus 16 comprises a tube voltage regulator 28 for applying a tube voltage regulated depending on the subject 12, to the cathode 22 of the radiation source 14, a high-voltage generator 30 for generating a high voltage and supplying the generated high voltage to the tube voltage regulator 28, and an exposure switch 32 operable by a radiological technician to energize the high-voltage generator 30.

The radiation conversion panel 18 is selected from an IP (Imaging Plate), an FPD (Flat Panel Detector), and a CCD (Charge Coupled Device) depending on the state of the subject 12, the location where a radiation image is captured, the purpose for which a radiation image is captured, etc.

Figure 3:
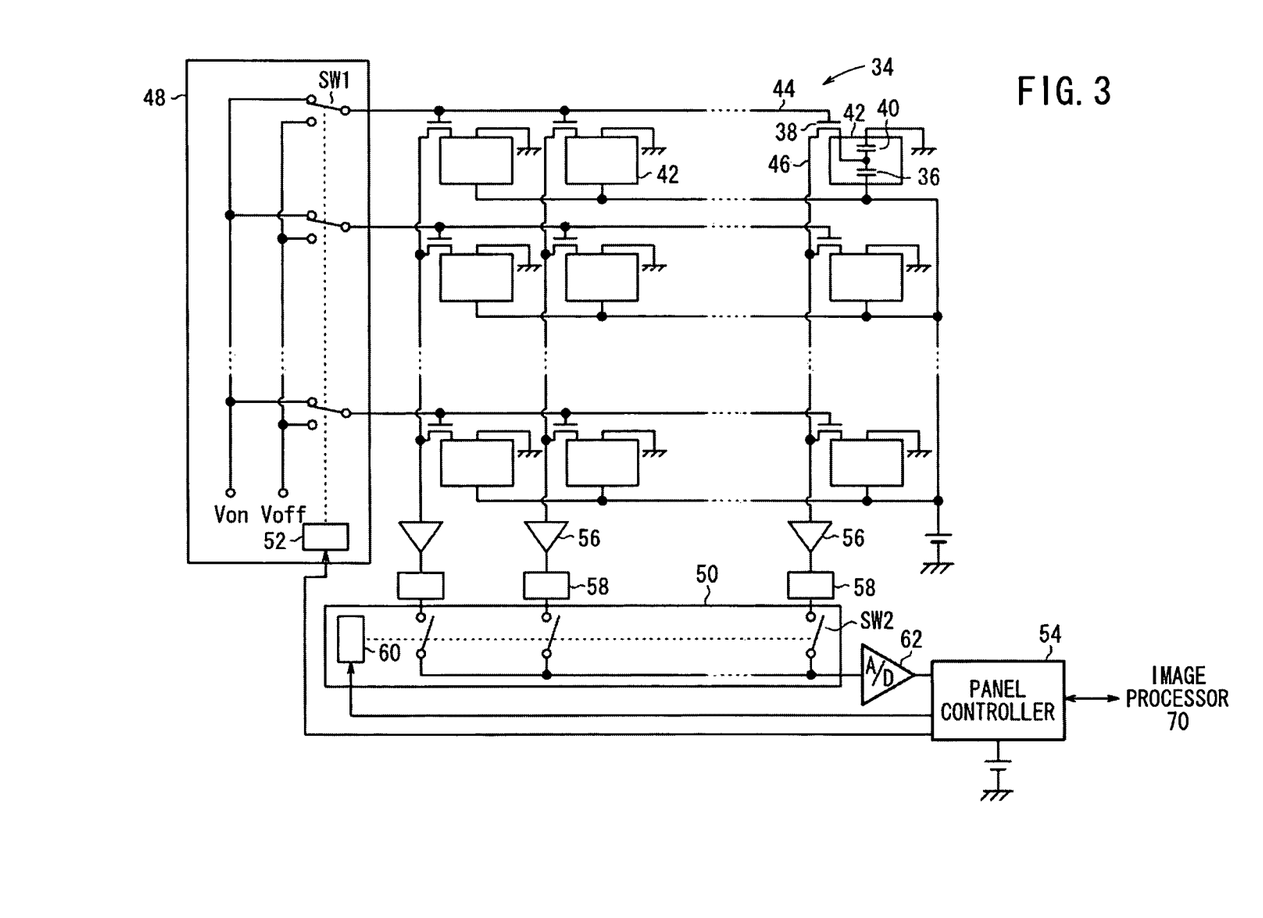
FIG. 3 is a block diagram of a circuit arrangement of an FPD serving as a radiation conversion panel.

FIG. 3 shows a circuit arrangement of an FPD 34 used as the radiation conversion panel 18. As shown in FIG. 3, the FPD 34 as the radiation conversion panel 18 comprises an array of thin-film transistors (TFTs) 38 arranged in rows and columns, and a photoelectric conversion layer 36 disposed on the array of TFTs 38. The photoelectric conversion layer 36 is made of a material such as amorphous selenium (a-Se) or the like for detecting X-rays and generating electric charges. When the radiation output from the radiation source 14 is applied to the radiation conversion panel 18, the photoelectric conversion layer 36 generates electric charges, and the generated electric charges are stored in the storage capacitors 40. Then, the TFTs 38 are turned on, each row at a time, to read the electric charges from the storage capacitors 40 as an image signal. In FIG. 3, the photoelectric conversion layer 36 and one of the storage capacitors 40 are shown as making up one pixel 42, with the pixel 42 being connected to one of the TFTs 38. Details of the other pixels 42 are omitted from illustration.

The TFTs 38, which are connected to the respective pixels 42, are connected to respective gate lines 44 extending in parallel to the rows, and to respective signal lines 46 extending in parallel to the columns. The gate lines 44 are connected to a line scanning driver 48, whereas the signal lines 46 are connected to a multiplexer 50 serving as a reading circuit.

The gate lines 44 are supplied with control signals Von, Voff from the line scanning driver 48 for turning on and off the TFTs 38 along the rows. The line scanning driver 48 comprises a plurality of switches SW1 for switching between the gate lines 44, and an address decoder 52 for outputting a selection signal for selecting one of the switches SW1 at a time. The address decoder 52 is supplied with an address signal from a panel controller 54.

Further, the signal lines 46 are supplied with electric charges stored in the storage capacitors 40 of the pixels 42 through the TFTs 38 arranged in the columns. The electric charges supplied to the signal lines 46 are amplified by amplifiers 56 connected respectively to the signal lines 46. The amplifiers 56 are connected through respective sample and hold circuits 58 to the multiplexer 50. The multiplexer 50 comprises a plurality of switches SW2 for successively switching between the signal lines 46, and an address decoder 60 for outputting a selection signal for selecting one of the switches SW2 at a time. The address decoder 60 is supplied with an address signal from the panel controller 54. The multiplexer 50 has an output terminal connected to an A/D converter 62. A radiation image signal generated by the multiplexer 50, based on the electric charges from the sample and hold circuits 58, is converted by the A/D converter 62 into a digital image signal representing radiation image information, which is supplied to the panel controller 54.

As shown in FIG. 1, the processing apparatus 20 comprises a panel selector 64 for selecting a radiation conversion panel 18 to be used for capturing a radiation image, an image capturing condition storage 66 for storing image capturing conditions depending on the selected radiation conversion panel 18, an image capturing condition setting unit 68 for reading image capturing conditions depending on the selected radiation conversion panel 18 from the image capturing condition storage 66 and setting the read image capturing conditions in the radiation source 14 and the radiation source control apparatus 16, an image processor 70 for processing radiation image information read from the radiation conversion panel 18, an image processing condition storage 72 for storing image processing conditions depending on the radiation conversion panel 18, an image processing condition setting unit 74 for reading image processing conditions depending on the selected radiation conversion panel 18 from the image processing condition storage 72 and setting the read image processing conditions in the image processor 70, and a display unit 76 for displaying the radiation image information processed by the image processor 70.

The panel selector 64 selects an appropriate radiation conversion panel 18 depending on the state of the subject 12 to be imaged, a region of the subject 12 which is to be imaged, the location where a radiation image is captured, the purpose for which a radiation image is captured, etc. Image capturing conditions stored in the image capturing condition storage 66 refer to conditions that are set, in relation to the radiation conversion panel 18, as a combination of the target 24, the filter 26, and the tube voltage which are capable of generating X-rays depending on the sensitivity characteristics of the selected radiation conversion panel 18. Image processing conditions stored in the image processing condition storage 72 refer to conditions that are capable of producing a radiation image having an appropriate contrast depending on the sensitivity characteristics of the selected radiation conversion panel 18.

Figure 4:
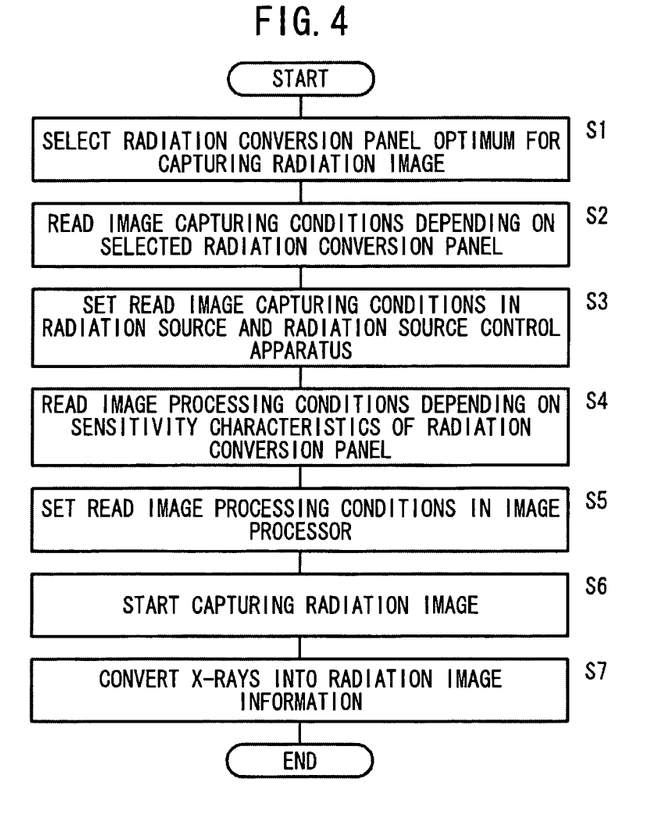
FIG. 4 is a flowchart of a method of adjusting a radiation image capturing system according to the present embodiment.

The radiation image capturing system 10 according to the present embodiment is basically constructed as described above. A method of adjusting the radiation image capturing system 10, i.e., a method of adjusting parameters used in the radiation image capturing system 10, will be described in detail below with reference to the accompanying drawings. FIG. 4 is a flowchart of the method of adjusting the radiation image capturing system 10.

First, the panel selector 64 of the processing apparatus 20 selects an appropriate radiation conversion panel 18 depending on the state of the subject 12 to be imaged, a region of the subject 12 which is to be imaged, the location where a radiation image is captured, the purpose for which a radiation image is captured, etc. in step S1 shown in FIG. 4.

If the subject 12 is an emergency patient or a subject which cannot be moved easily or has a special region to be imaged, then an IP which can easily be carried around and can have a large choice of shapes may be selected as the radiation conversion panel 18. As in the case of an operation or a complete medical checkup, if a high-quality radiation image of the subject 12 needs to be captured quickly, then the FPD 34 may be selected as the radiation conversion panel 18. If a real-time moving image or a three-dimensional radiation image of the subject 12 is to be captured, then a CCD may be selected as the radiation conversion panel 18 though the CCD is lower in image quality than the IP and the FPD 34.

When the radiation conversion panel 18 is selected by the panel selector 64, the image capturing condition setting unit 68 reads image capturing conditions corresponding to the sensitivity characteristics of the selected radiation conversion panel 18 from the image capturing condition storage 66 in step S2, and then sets the read image capturing conditions in the radiation source 14 and the radiation source control apparatus 16 in step S3.

The image capturing condition storage 66 stores therein a combination of the target 24, the filter 26, and the tube voltage which are capable of generating X-rays depending on the sensitivity characteristics of the selected radiation conversion panel 18, as image capturing conditions.

Figure 5:
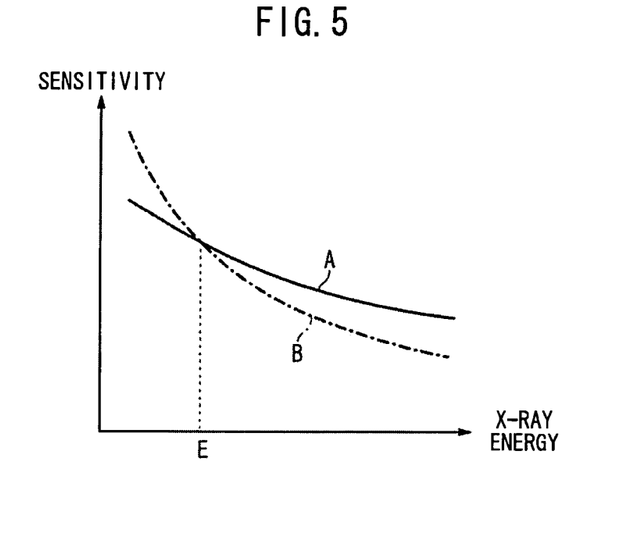
FIG. 5 is a diagram showing the sensitivity characteristics of two types of radiation conversion panels.

FIG. 5 shows the sensitivity characteristics A, B of two types of radiation conversion panels, for example. The sensitivity levels represented by the sensitivity characteristics A, B shown in FIG. 5 change differently as the level of the X-ray energy changes. If it is assumed that the level of the X-ray energy at which the sensitivity levels represented by the sensitivity characteristics A, B are equal to each other is represented by E, then the relationship between the sensitivity characteristics A, B is reversed across the X-ray energy level E. Specifically, in an X-ray energy level zone lower than the X-ray energy level E, the sensitivity characteristic B is higher than the sensitivity characteristic A. In an X-ray energy level zone higher than the X-ray energy level E, the sensitivity characteristic A is higher than the sensitivity characteristic B. Therefore, when the level of the X-ray energy applied to the subject 12 is lower than the X-ray energy level E, a radiation conversion panel 18 having the sensitivity characteristic B which is higher than the sensitivity characteristic A is selected, and when the level of the X-ray energy applied to the subject 12 is higher than the X-ray energy level E, a radiation conversion panel 18 having the sensitivity characteristic A which is higher than the sensitivity characteristic B is selected.

For example, when the radiation image capturing system 10 is used as a mammographic system for capturing breast images, since the slight difference between different amounts of absorption by a breast of X-rays needs to be displayed with as high resolution and contrast as possible, a low level of X-ray energy is applied to the subject 12 to acquire a radiation image thereof. In this case, the radiation conversion panel 18 having the sensitivity characteristic B which is higher than the sensitivity characteristic A in the X-ray energy level zone lower than the X-ray energy level E is selected. When the radiation image capturing system 10 is used to capture a chest image or an image of a body region including bones that are less permeable to X-rays than bone-free body regions, a high level of X-ray energy is applied to the subject 12 to acquire a radiation image thereof. In this case, the radiation conversion panel 18 having the sensitivity characteristic A which is higher than the sensitivity characteristic B in the X-ray energy level zone higher than the X-ray energy level E is selected.

The image capturing condition setting unit 68 reads image capturing conditions that are representative of a combination of the target 24, the filter 26, and the tube voltage which are capable of producing an X-ray energy level depending on the sensitivity characteristics of the radiation conversion panel 18 selected by the panel selector 64, from the image capturing condition storage 66, and sets the read image capturing conditions in the radiation source 14 and the radiation source control apparatus 16.

Figure 7:
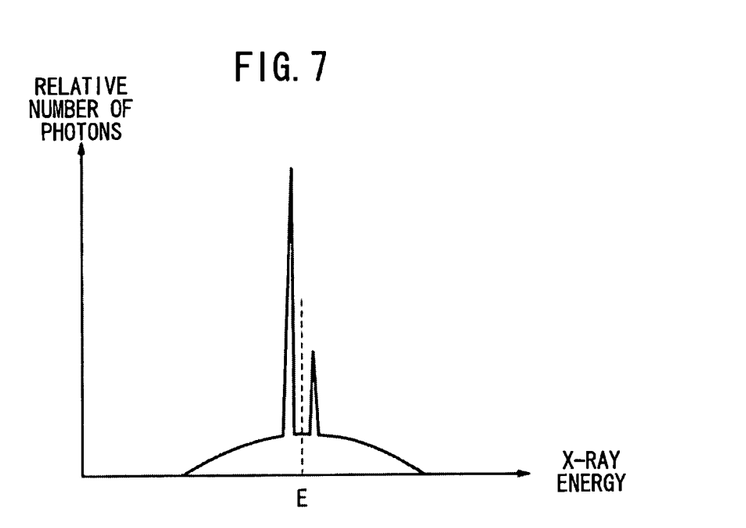
FIG. 7 a graph showing an X-ray spectrum which is plotted when a target is made of molybdenum (Mo) and a filter is made of rhodium (Rh)
Figure 8:
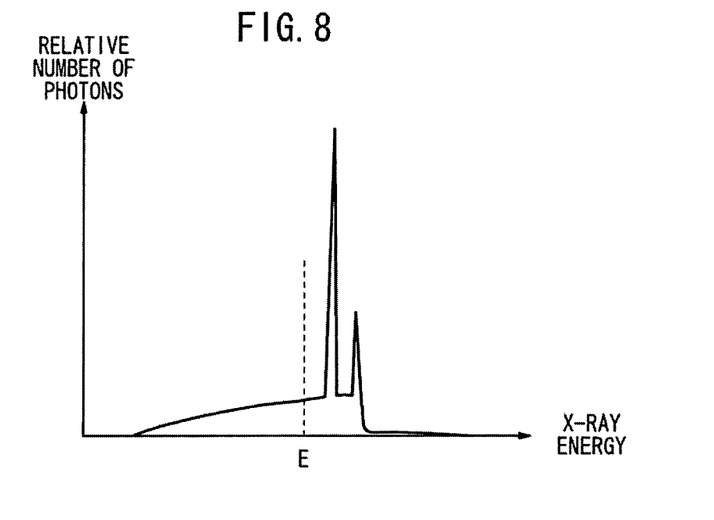
FIG. 8 a graph showing an X-ray spectrum which is plotted when a target and a filter are made of rhodium (Rh).

The combination of the target 24, the filter 26, and the tube voltage depending on the sensitivity characteristics of the radiation conversion panel 18 will be described below. FIG. 6 shows an X-ray spectrum plotted when the target 24 and the filter 26 are made of Mo, the X-ray spectrum having a major portion distributed in the X-ray energy level zone lower than the X-ray energy level E. FIG. 7 shows an X-ray spectrum plotted when the target 24 is made of Mo and the filter 26 is made of Rh, the X-ray spectrum having a major portion distributed in the X-ray energy level zone lower than the X-ray energy level E as in FIG. 6. FIG. 8 shows an X-ray spectrum plotted when the target 24 and the filter 26 are made of Rh, the X-ray spectrum having a major portion distributed in the X-ray energy level zone higher than the X-ray energy level E. Furthermore, the distribution of the X-ray energy with respect to the X-ray energy level E can be adjusted by regulating the tube voltage. For example, when the radiation conversion panel 18 having the sensitivity characteristic A is selected, a combination of the target 24, the filter 26, and the tube voltage for positioning the major portion of the X-ray spectrum in the X-ray energy level zone higher than the X-ray energy level E as shown in FIG. 8 is selected and read out as image capturing conditions. Conversely, when the radiation conversion panel 18 having the sensitivity characteristic B is selected, a combination of the target 24, the filter 26, and the tube voltage for positioning the major portion of the X-ray spectrum in the X-ray energy level zone lower than the X-ray energy level E as shown in FIG. 6 or 7 is selected and read out as image capturing conditions.

Based on the image capturing conditions set by the image capturing condition setting unit 68, the target 24 and the filter 26 of the radiation source 14 are selected, and the tube voltage is regulated by the tube voltage regulator 28 of the radiation source control apparatus 16.

The image processing condition setting unit 74 reads image processing conditions depending on the sensitivity characteristics of the radiation conversion panel 18 selected by the panel selector 64, from the image processing condition storage 72 in step S4, and sets the read image processing conditions in the image processor 70 in step S5. Specifically, if the X-ray energy based on the image capturing conditions set by the image capturing condition setting unit 68 is of the higher energy level, then since the contrast of a resultant radiation image tends to be low, image processing conditions that are capable of processing radiation image information to increase density gradation changes of the radiation image are set in the image processor 70. If the X-ray energy based on the image capturing conditions set by the image capturing condition setting unit 68 is of the lower energy level, then since the contrast of a resultant radiation image tends to be high, image processing conditions that are capable of processing radiation image information to reduce density gradation changes of the radiation image are set in the image processor 70.

After the image capturing conditions and the image processing conditions are set as described above, a radiation image of the subject 12 is captured in step S6 as follows:

After having positioned a body region to be imaged of the subject 12 with respect to the selected radiation conversion panel 18, the radiological technician operates the exposure switch 32 to apply X-rays to the subject 12. Specifically, when the exposure switch 32 is operated, a high voltage generated by the high-voltage generator 30 is regulated by the tube voltage regulator 28 into a desired tube voltage, which is applied to the cathode 22 of the radiation source 14. The cathode 22 emits an electron beam to the target 24, which outputs X-rays having a given X-ray spectrum. The X-rays output from the target 24 pass through the filter 26, which removes unnecessary X-ray energy. The X-rays that have passed through the filter 26 are then applied to the subject 12. The X-rays that have passed through the subject 12 are applied to the radiation conversion panel 18, which converts the X-rays into radiation image information in step S7.

In the following description, it is assumed that the FPD 34 shown in FIG. 3 is selected as the radiation conversion panel 18.

The photoelectric conversion layer 36 of the pixels 42 of the FPD 34 converts the applied X-rays into electric signals, which are stored as electric charges in the storage capacitors 40. The stored electric charges, which represent radiation image information of the subject 12, are read from the storage capacitors 40 of the pixels 42 according to address signals which are supplied from the panel controller 54 to the line scanning driver 48 and the multiplexer 50.

Specifically, in response to the address signal supplied from the panel controller 54, the address decoder 52 of the line scanning driver 48 outputs a selection signal to select one of the switches SW1, which supplies the control signal Von to the gates of the TFTs 38 connected to the gate line 44 corresponding to the selected switch SW1. In response to the address signal supplied from the panel controller 54, the address decoder 60 of the multiplexer 50 outputs a selection signal in order to successively turn on the switches SW2 to switch between the signal lines 46, for thereby reading, through the signal lines 46, the electric charges that are stored in the storage capacitors 40 of the pixels 42 connected to the selected gate line 44.

The electric charges read from the storage capacitors 40 of the pixels 42 connected to the selected gate line 44 of the FPD 34 are amplified by the respective amplifiers 56, sampled by the sample and hold circuits 58, and supplied to the multiplexer 50. Based on the supplied electric charges, the multiplexer 50 generates and supplies a radiation image signal to the A/D converter 62, which converts the radiation image signal into digital signals. The digital signals, which represent the radiation image information, are supplied from the panel controller 54 to the image processor 70 of the processing apparatus 20.

Similarly, the address decoder 52 of the line scanning driver 48 successively turns on the switches SW1 to switch between the gate lines 44 according to the address signal supplied from the panel controller 54. The electric charges stored in the storage capacitors 40 of the pixels 42 connected to the successively selected gate lines 44 are read through the signal lines 46, processed by the multiplexer 50, and converted into digital signals by the A/D converter 62, which are supplied from the panel controller 54 to the image processor 70.

The image processor 70 processes the radiation image information supplied from the radiation conversion panel 18 according to the image processing conditions set by the image processing condition setting unit 74. The processed radiation image information is supplied to the display unit 76, which displays a radiation image based on the supplied radiation image information for the radiological technician to confirm. If the radiological technician confirms that the displayed radiation image is appropriate, then the radiation image information is sent to the doctor for diagnosis.

If the IP is selected as the radiation conversion panel 18, then stimulating light is applied to the IP which has stored radiation image information to cause the IP to emit stimulated light representative of the stored radiation image information. The stimulated light is then converted by a photomultiplier or the like into electric signals representative of the stored radiation image information. The electric signals are then supplied to the image processor 70, which processes the radiation image information represented by the electric signals according to the image processing conditions set by the image processing condition setting unit 74, in the same manner as the radiation image information produced from the FPD 34, thereby obtaining desired radiation image information.

If the CCD is selected as the radiation conversion panel 18, then electric signals generated by the CCD as representing radiation image information are supplied to the image processor 70, which processes the radiation image information represented by the electric signals according to the image processing conditions set by the image processing condition setting unit 74, in the same manner as the radiation image information produced from the FPD 34, thereby obtaining desired radiation image information.

The radiation conversion panel 18 may include a radiation conversion panel other than the IP, FPD 34, and the CCD. For example, the radiation image capturing system 10 may employ a light readout type of radiation conversion panel for acquiring radiation image information. The light readout type of radiation conversion panel comprises a matrix of solid-state detecting devices. When a radiation is applied to the matrix of solid-state detecting devices, the solid-state detecting devices store an electrostatic latent image depending on the dose of the applied radiation. For reading the stored electrostatic latent image, reading light is applied to the radiation conversion panel to cause the solid-state detecting devices to generate an electric current representing radiation image information which is indicative of the electrostatic latent image. When erasing light is applied to the radiation conversion panel, radiation image information representing a residual electrostatic latent image is erased from the radiation conversion panel, which can thus be reused as in the case of the stimulable phosphor panel.

Although a certain preferred embodiment of the present invention has been shown and described in detail, it should be understood that various changes and modifications may be made therein without departing from the scope of the appended claims.

What is claimed is:

1. A radiation image capturing system comprising:
    a radiation source for outputting a radiation to pass through a subject;
    a radiation source control apparatus for controlling the radiation source;
    a plurality of radiation conversion panels for being irradiated with the radiation which has passed through the subject, having different systems for converting the radiation into radiation image information of the subject;
    an image capturing condition storage for storing, in advance, image capturing conditions corresponding to the plurality of radiation conversion panels, the image capturing conditions including combinations of a target, a filter, and a tube voltage of the radiation source for outputting the radiation depending on sensitivity characteristics of the plurality of radiation conversion panels;
    a panel selector for selecting one radiation conversion panel to be used for capturing a radiation image among the plurality of radiation conversion panels; and
    an image capturing condition setting unit for reading out one of the image capturing conditions depending on the selected one radiation conversion panel from the image capturing condition storage, and setting the read-out one image capturing condition to the radiation source and the radiation source control apparatus;
    wherein the plurality of radiation conversion panels having different systems include at least a first radiation conversion panel having a solid-state detector for converting radiation directly into electric signals and reading out the electric signals and a second radiation conversion panel having a solid-state detector for converting radiation into visible light with a scintillator and then converting the visible light into electric signals and reading out the electric signals, and
    wherein the radiation source is adjusted based on the one image capturing condition set by the image capturing condition setting unit, and the adjusted radiation source applies the radiation to the subject.

2. A radiation image capturing system according to claim 1, further comprising:
    an image processor for processing the radiation image information acquired from the selected radiation conversion panel; and
    an image processing condition setting unit for setting image processing conditions depending on the sensitivity characteristics of the selected radiation conversion panel;
    wherein the image processor processes the acquired radiation image information based on the image processing conditions set by the image processing condition setting unit.

3. A radiation image capturing system according to claim 1, wherein each of the plurality of radiation conversion panels comprises at least one radiation conversion panel for converting the radiation into digital radiation image information.

4. A radiation image capturing system according to claim 1, wherein the panel selector selects the one radiation conversion panel based on one or more conditions among a state of the subject, a location where a radiation image is captured, and a purpose for which the radiation image is captured.

5. A method of adjusting a radiation image capturing system including a radiation source for outputting a radiation to pass through a subject, a radiation source control apparatus for controlling the radiation source, a plurality of radiation conversion panels for being irradiated with the radiation which has passed through the subject, having different systems for converting the radiation into radiation image information of the subject, and an image capturing condition storage for storing, in advance, image capturing conditions corresponding to the plurality of radiation conversion panels, the image capturing conditions including combinations of a target, a filter, and a tube voltage of the radiation source for outputting the radiation depending on sensitivity characteristics of the plurality of radiation conversion panels, comprising the steps of:

selecting one radiation conversion panel to be used for capturing a radiation image among the plurality of radiation conversion panels;

reading out one of the image capturing conditions depending on the selected one radiation conversion panel from the image capturing condition storage, and setting the read-out image capturing condition to the radiation source and the radiation source control apparatus; and adjusting the radiation source based on the set image capturing condition, wherein the plurality of radiation conversion panels having different systems include at least a first radiation conversion panel having a solid-state detector for converting radiation directly into electric signals and reading out the electric signals and a second radiation conversion panel having a solid-state detector for converting radiation into visible light with a scintillator and then converting the visible light into electric signals and reading out the electric signals.

6. A method according to claim 5, further comprising the steps of:

setting image processing conditions depending on the sensitivity characteristics of the selected radiation conversion panel; and processing the radiation image information acquired from the selected radiation conversion panel based on the set image processing conditions.

7. A method according to claim 5, wherein each of the plurality of radiation conversion panels comprises at least one radiation conversion panel for converting the radiation into digital radiation image information.

* * * * *